(12) United States Patent
Manion et al.

(10) Patent No.: US 9,650,071 B2
(45) Date of Patent: May 16, 2017

(54) BI-DIRECTIONAL TOWED SNOWPLOW AND METHOD OF PLOWING

(71) Applicant: Cives Corporation, Roswell, GA (US)

(72) Inventors: Leo P. Manion, Durham (CA); William J. Reeves, Mount Forest (CA); Gerald N. Simpson, Gowanstown (CA); Amiya Mishra, Guelph (CA)

(73) Assignee: CIVES CORPORATION, Roswell, GA (US)

( * ) Notice: Subject to any disclaimer, the term of this patent is extended or adjusted under 35 U.S.C. 154(b) by 0 days.

(21) Appl. No.: 14/710,056

(22) Filed: May 12, 2015

(65) Prior Publication Data
US 2016/0332666 A1 Nov. 17, 2016

(51) Int. Cl.
B62D 13/04 (2006.01)
B62D 7/20 (2006.01)
B62D 7/15 (2006.01)
E01H 5/06 (2006.01)
B62D 7/16 (2006.01)

(52) U.S. Cl.
CPC .......... *B62D 7/163* (2013.01); *B62D 7/1509* (2013.01); *B62D 7/20* (2013.01); *B62D 13/04* (2013.01); *E01H 5/06* (2013.01)

(58) Field of Classification Search
CPC ........ B62D 7/1509; B62D 7/20; B62D 13/04; B62D 13/1527
USPC .............................. 280/98, 99, 93.51, 93.502
See application file for complete search history.

(56) References Cited

U.S. PATENT DOCUMENTS

| 3,311,387 | A | * | 3/1967 | Klemm | B62D 13/04 280/103 |
| 3,899,188 | A | * | 8/1975 | Curry | B62D 13/04 280/81.6 |
| 4,655,467 | A | * | 4/1987 | Kitzmiller | B60G 11/225 280/124.128 |
| 5,048,853 | A | * | 9/1991 | Trefz | B62D 7/1527 180/411 |
| 6,131,689 | A | * | 10/2000 | Nodorft | B62D 7/142 180/234 |

(Continued)

FOREIGN PATENT DOCUMENTS

| CA | 2 491 842 A1 | 9/2012 |
| CA | 2 767 095 A1 | 3/2014 |

OTHER PUBLICATIONS

The extended European Search Report issue on Oct. 17, 2016, by the European Patent Office in corresponding European Patent Application No. 16166409.9-1755. (10 pages).

(Continued)

*Primary Examiner* — Ruth Ilan
(74) *Attorney, Agent, or Firm* — Buchanan Ingersoll & Rooney PC

(57) ABSTRACT

A steering mechanism for steering at least two wheels in a parallel manner throughout their arcs of rotation by removing Ackerman and other steering geometries so that the wheels may remain parallel. The steering mechanism includes a central linkage for modifying the arcs of rotation of the wheels. The steering mechanism is controlled by an actuator system that also operates a restriction device to ensure safe operation. The steering mechanism and the actuator system may be included in vehicles such as a bi-directional towed snowplow.

13 Claims, 9 Drawing Sheets

(56) References Cited

U.S. PATENT DOCUMENTS

| | | | | |
|---|---|---|---|---|
| 6,158,759 | A * | 12/2000 | Perry | B62D 13/04 |
| | | | | 280/444 |
| 6,308,976 | B1 * | 10/2001 | Mitchell | B62D 13/04 |
| | | | | 280/419 |
| 7,278,511 | B1 * | 10/2007 | Gass | B62D 7/1509 |
| | | | | 180/409 |
| 7,316,288 | B1 * | 1/2008 | Bennett | B62D 7/1509 |
| | | | | 180/204 |
| 7,367,407 | B2 | 5/2008 | Lannert | |
| 8,302,728 | B1 * | 11/2012 | Dotson | A63H 17/262 |
| | | | | 180/408 |
| 9,004,519 | B1 | 4/2015 | Beech | |

OTHER PUBLICATIONS

Office Action issued by the Canadian Patent Office in Canadian Application No. 2,894,111 on Jun. 10, 2016 (4 PGS).

* cited by examiner

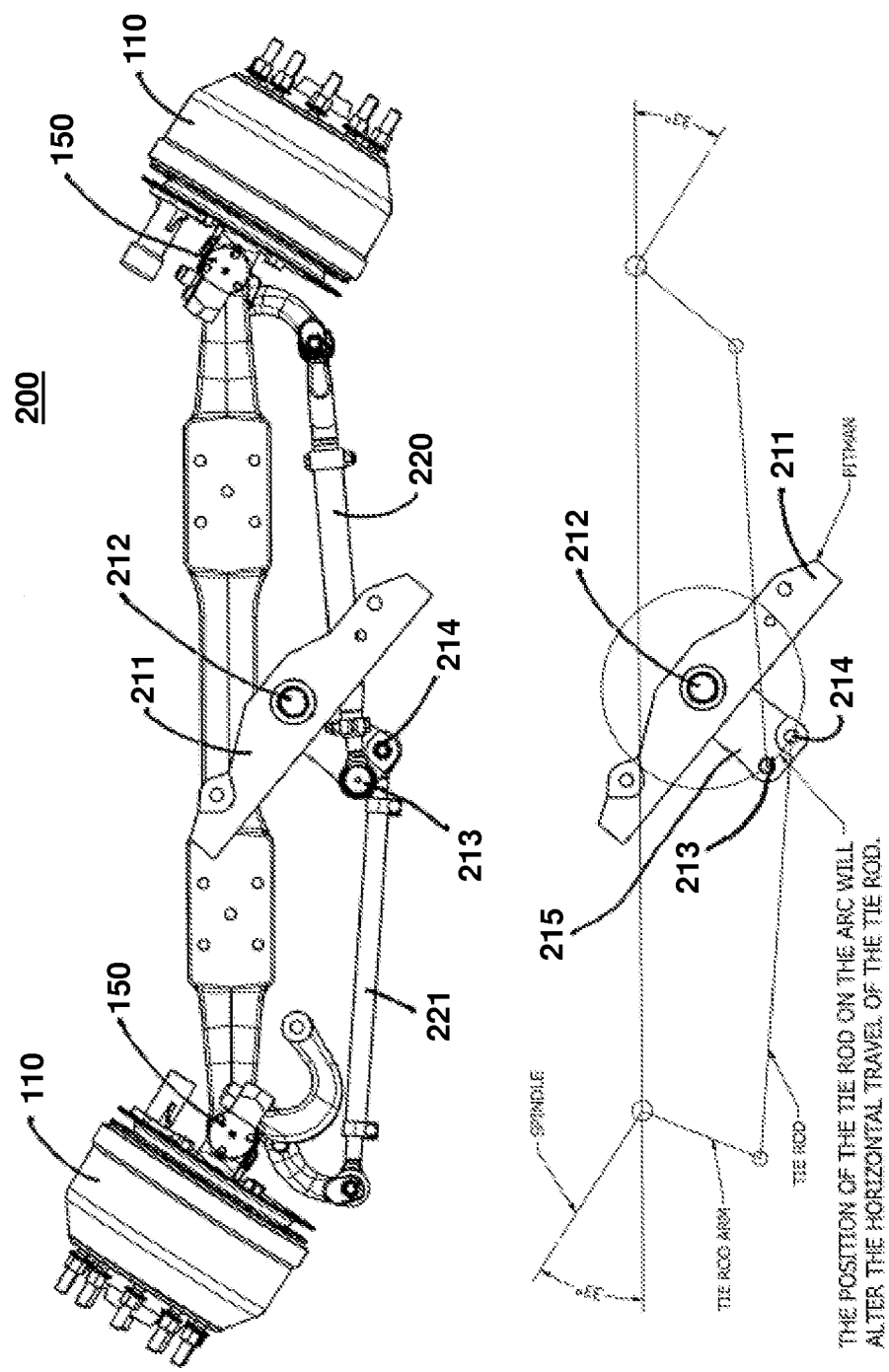

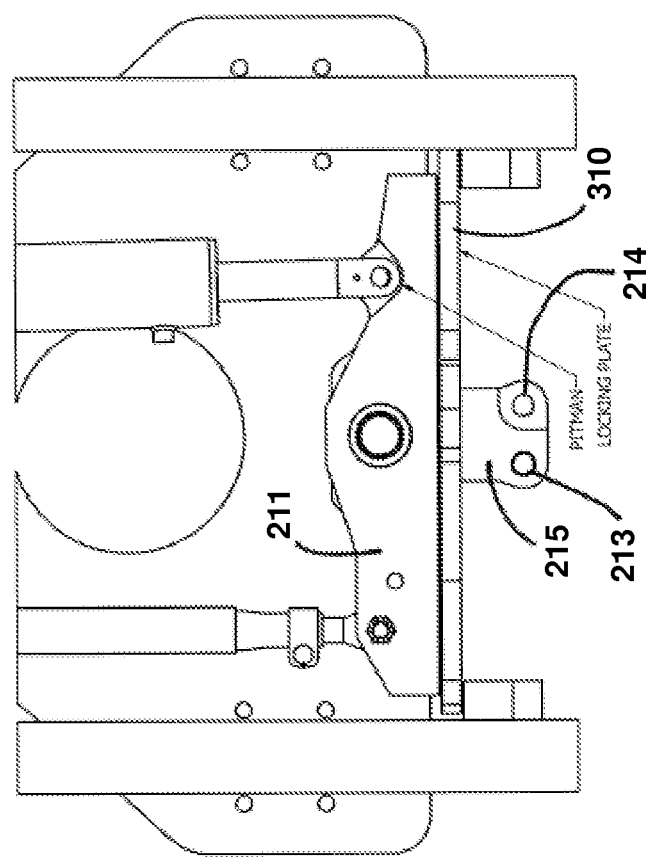

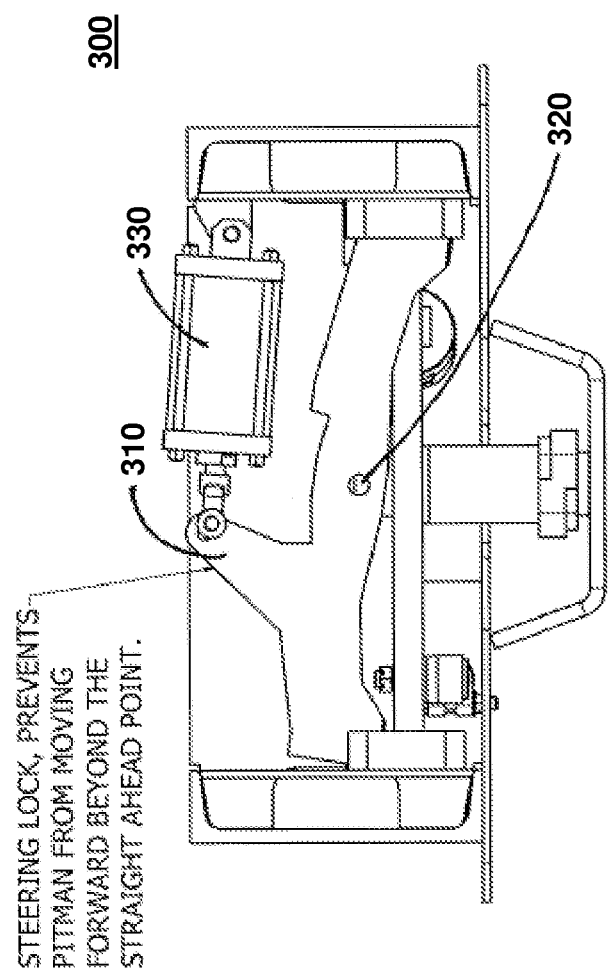

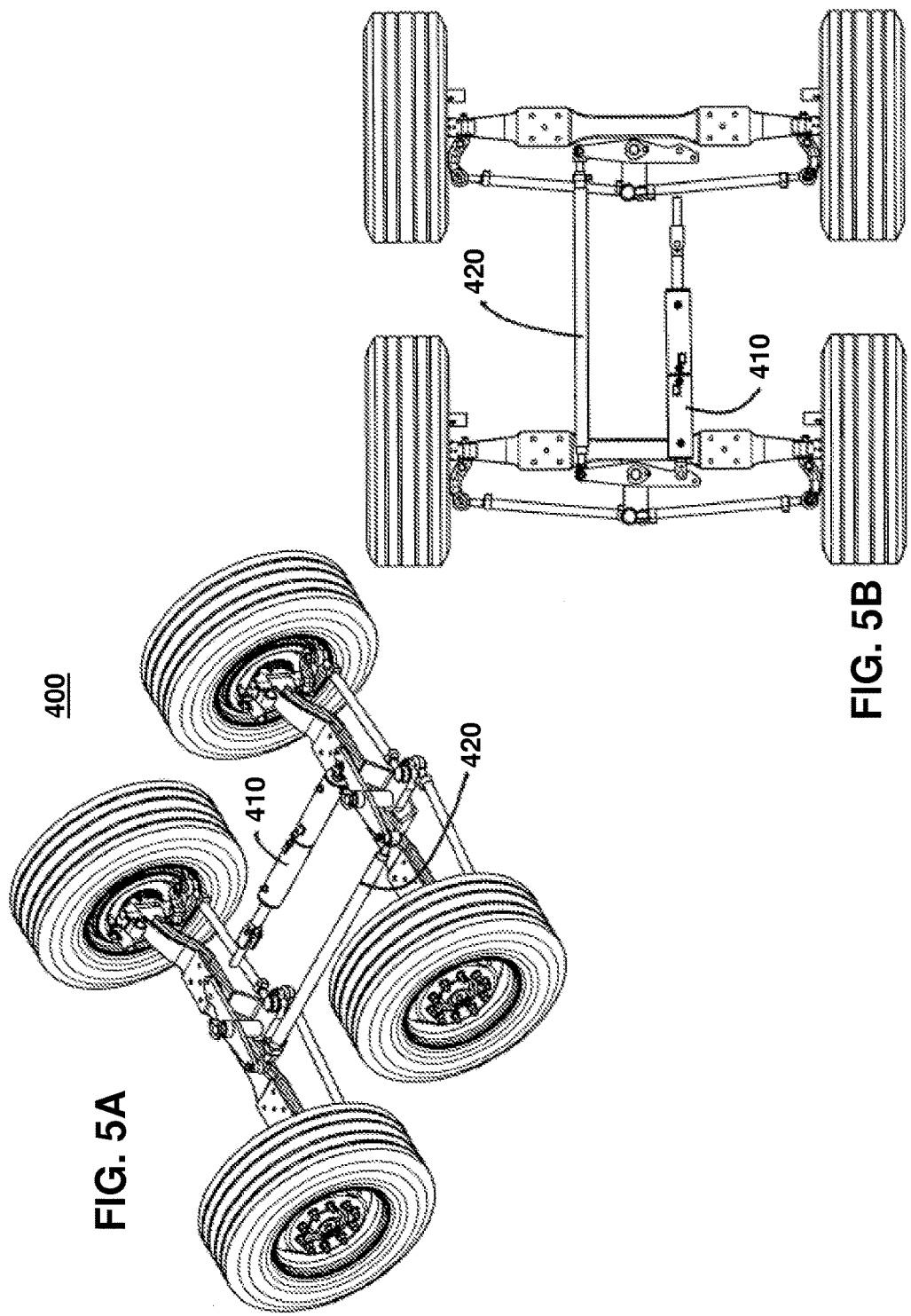

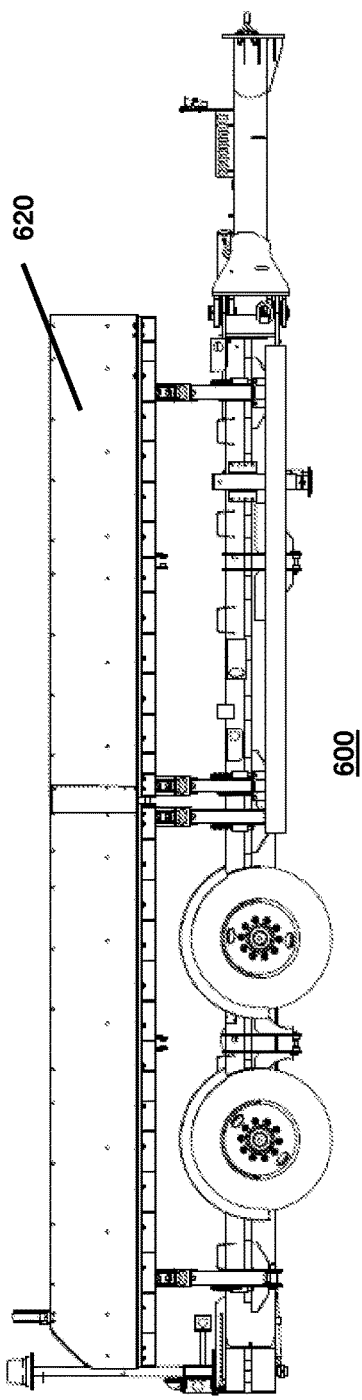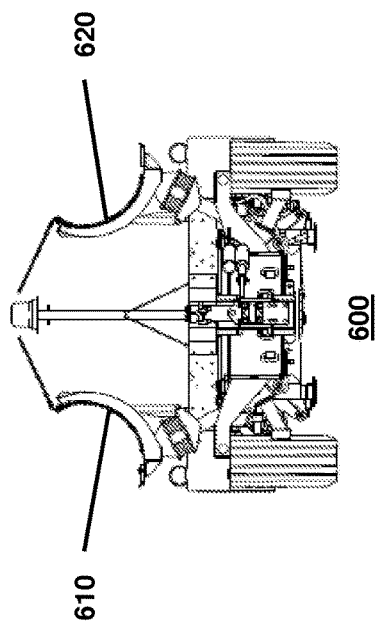

BI-DIRECTIONAL TOWED SNOWPLOW AND METHOD OF PLOWING

FIELD OF THE INVENTION

The present invention relates to plows and more particularly a bi-directional towed snowplow and a method of plowing.

BACKGROUND OF THE INVENTION

Snow is typically removed from pavement such as roads, highways, runways, and the like by a truck that includes a snowplow with a moldboard that is mounted on the front end of truck. A variety of arrangements exist for raising and lowering the moldboard, changing the angle the moldboard makes with the longitudinal axis of the truck and with respect to the longitudinal axis of the pavement being cleared. The lowermost edge of the moldboard may contact or be in near contact with the pavement being plowed or may be lifted to be out of contact with the road (e.g., by several inches or feet) so that, for example, pavement already cleared of snow is not again plowed and obstructions may be cleared, such as speed bumps.

Wing portions and other attachments have been used to effectively extend the width of the moldboard to remove more snow from pavement being plowed in a single pass. Front-mounted snowplows can often be angled towards the right or left to push snow to either side of the vehicle via the use of hydraulics. When known snowplows are used on pavement, the plowed snow may be deposited on previously cleared portions of the pavement, particularly in instances where additional plowing of pavement is necessary prior to the melting or removal of previously plowed snow. One mechanism is to provide a towed snowplow, such as described in U.S. Pat. No. 7,367,407 issued to the same assignee, herein incorporated by reference.

On a different note, in conventional steering mechanisms 100, an example of which is shown in FIG. 1, steering geometries are employed to prevent the sideway slippage of wheels when turning. Ackerman steering geometry is one such steering geometry that is commonly employed. Ackerman steering geometry helps prevent the slippage of wheels slipping sideways when turning by having each wheel track an independent pivot that is close to each wheel's hub, as discussed in more detail below. Such geometries, however, may be disadvantageous in instances where the orientation of the vehicle is to remain at an angle, such as in the instance of a towed snowplow being oriented at an angle to push snow towards the outside of pavement. These traditional steering geometries can result in wheel alignment that is out of parallel when angled orientation is used for prolonged periods of time, such as in the case of an engaged snowplow, which can in turn result in uneven tire wear and additional complications. This would be even more true when the conventional mechanism were used to try to move the towed snowplow in either direction, right or left of the vehicle towing the snowplow. Other types of steering geometry are known, but these other types of steering geometry also result in the wheels having alignment that is out of parallel, resulting in uneven tire wear and addition complications when the orientation of the vehicle is to remain at an angle.

Thus, there is a need for a steering mechanism that can compensate for the angled orientation of a vehicle to provide for more properly oriented wheels, thereby reducing tire wear and increasing vehicle performance. Further, it would be advantageous if such a steering mechanism would prevent the towed snow plow from going from one side to the other because of over-steering or the like in that the towed snowplow might inadvertently enter the travel path of oncoming traffic or other obstacles or obstructions.

SUMMARY OF THE INVENTION

The steering mechanism includes a plurality of tie rods and a linkage configured to convert rotational motion about an axis into linear motion. The linkage has an upper portion attached to an actuator, a middle portion, and a lower portion attached to the plurality of tie rods. The lower portion of the linkage includes an end extending radially outward from the axis. The end is configured to rotatably secure ends of the plurality of tie rods so that two wheels are turned by the plurality of tie rods around a common pivot point in a parallel arrangement throughout the rotational motion of the linkage around the axis.

The steering mechanism rotation is limited by a restriction device. The restriction device includes a lock plate and an actuator. The lock plate pivots about a pivot point perpendicular to and intersecting the axis of the linkage. The lock plate prevents rotation of the upper portion beyond a central position when the lock plate is first and second fully engaged positions, and the lock plate also prevents any rotation of the upper portion when the lock plate is pivoting between the first and second fully engaged position.

The steering mechanism may be employed in, for example, a bi-directional snowplow that includes the steering mechanism and at least two moldboards. The bi-directional snowplow can use the steering mechanism to secure leftward mode or rightward mode operations so that plowing can occur efficiently and quickly.

BRIEF DESCRIPTION OF THE DRAWING FIGURES

FIGS. 3A-3D provide different views of one embodiment of the steering mechanism.

Figure 4C:
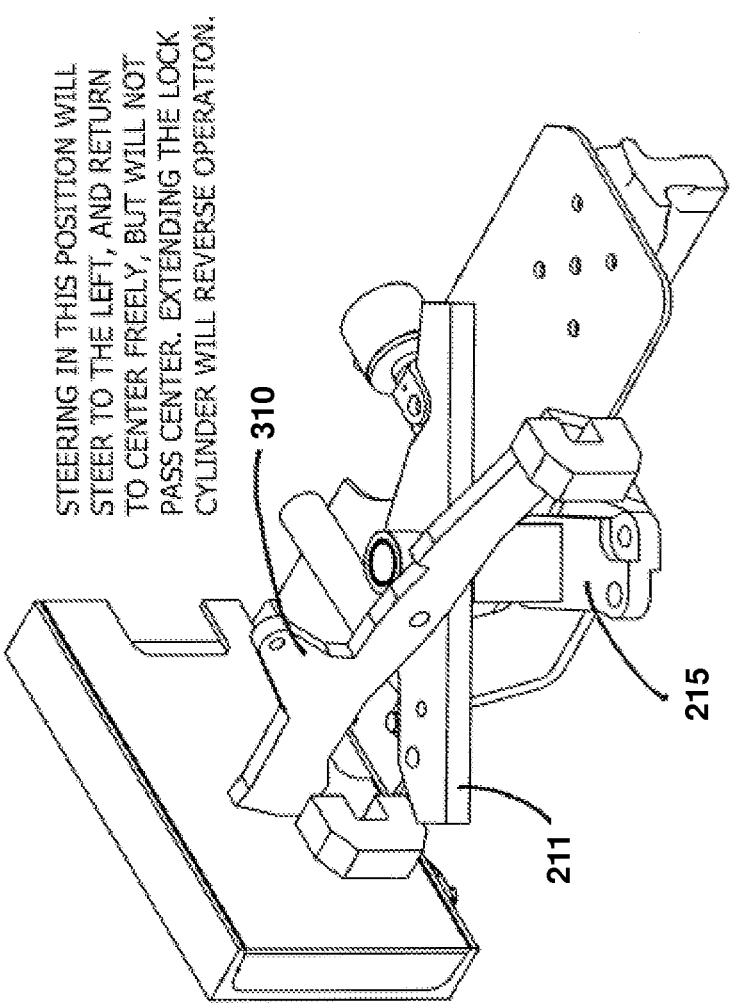

FIGS. 4A-4C provide different views of one embodiment of the restriction device.

FIGS. 5A and 5B provide different views of an embodiment of a system employing multiple steering mechanisms.

FIGS. 6A and 6B provide different views of an embodiment of a towed snowplow with moldboards utilizing the steering mechanism.

DETAILED DESCRIPTION OF THE INVENTION

Figure 1:
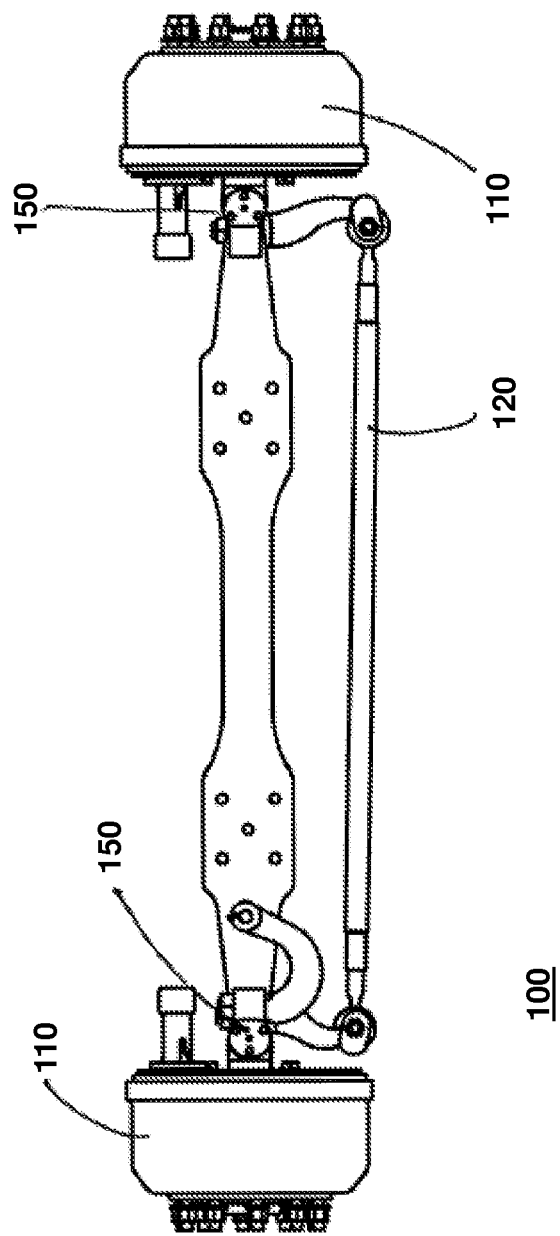
FIG. 1 depicts a prior art steering mechanism that employs steering geometries like Ackerman steering geometry.

Referring to the drawings FIG. 1 illustrates a known steering mechanism 100 used in conventional vehicles. Conventional steering mechanisms 100 typically employ a single rod 120 to control the steering of the wheels 110. In conventional vehicles, the rotation of the wheels 110 that are controlled by a conventional steering mechanism 100 is corrected using steering geometry, such as the Ackerman steering geometry, so that each wheel rotates about independent pivot points 150 that are located close to hubs of each wheel 110. This helps prevent sideways slippage that occurs when the wheels 110 rotate about a common point.

When used in a context where an angled orientation of the vehicle is desirable, such as with a towed snowplow, however, conventional steering mechanisms 100 are undesirable because the steering geometry that modifies the steering of the wheels continues to operate, resulting in wheels that are not truly aligned in parallel. When used when a towed snowplow, for example, conventional steering mechanisms 100 would introduce uneven tire wear when the towed snowplow is used for extended periods at particular orientations (e.g., angled to push snow away from the vehicle). For instance, the use of Ackerman steering geometry, which ordinarily helps address a slippage problem, would actually introduce a wheel slippage problem when used in a towed snowplow that is to be oriented at an angle. Thus, conventional steering mechanisms 100 may actually be detrimental to such vehicles when used in their desired mode of operation.

Figure 2:
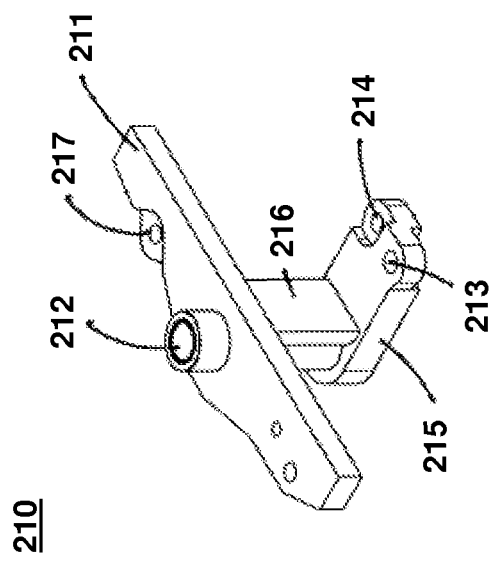
FIG. 2 depicts one embodiment of the central linkage.

FIG. 2 depicts one embodiment of a central linkage 210 for the steering mechanism 200 described here that addresses this concern with conventional steering mechanisms. The central linkage 210 rotates about a central linkage pivot 212. The central linkage 210 includes an upper portion 211 and a lower portion 215 connected by a middle portion 216. The upper portion 211 may include at least one fixture point 217 located towards an end of the upper portion 211. The central linkage pivot 212 exists for receiving a shaft about which the central linkage 210 rotates. The central linkage pivot 212 extends through the middle portion 216 and to the lower portion 215. The lower portion 215 extends radially away from the middle portion 216 and the central linkage pivot 212. An end of the lower portion 215 includes at least two attachment points 213, 214 for rotatably securing ends of tie rods 220, 221 (illustrated in FIG. 3A, and discussed below). In the embodiment shown in FIG. 2, the attachment points 213, 214 exist in different vertical planes so that the components do not interfere with each other during steering.

The fixture point 217 may be located at any point of the upper portion 210 and provides a place for securing an actuator. The actuator provides the force to cause the rotation of the central linkage 210 about the central linkage pivot 212. This force of the actuator resists any feedback resulting from the travel of wheels 110 along the surface which would tend to cause the counter-rotation of the central linkage 210. This helps hold the steering mechanism 200 at the desired steering angle. In some embodiments, the actuator may be a hydraulic cylinder. It will be apparent to persons having skill in the relevant art that the placement of the fixture point 217 on the upper portion may vary dependent on the type of actuator used, the type of vehicle for which the steering mechanism 200 is used, the power provided to the actuator, etc.

The attachment points 213, 214 of the lower portion 215 may be formed along any portion of the lower portion 215 so that the wheels 110 may be maintained in a parallel fashion. In one embodiment, the attachment points 213, 214 may exist along the same plane, while still allowing ends of the tie rods 220, 221 to rotate freely throughout the rotation of the central linkage 210 as a result of their orientation. In another embodiment, the attachment points 213, 214 may be placed closer to the central linkage pivot 212 rather than towards an end of the lower portion 215. Other variations in the arrangement of the attachment points 213, 214 relative to other aspects of the central linkage 210 that result in parallel steering will be apparent to persons having skill in the relevant art.

The central linkage 210 may be made of a high-strength material capable of resisting the various forces being applied to the central linkage 210, such as forces due to actuators, tie rods, etc. Aspects of the central linkage 210 may be separately formed, such as a separately formed upper portion 211, lower portion 215, middle portion 216, and central linkage pivot 212 that are fastened together using a suitable method, or the central linkage 210 may be integrally formed from one piece of material.

FIGS. 3A-3D depict one embodiment of the steering mechanism 200 described here. The steering mechanism 200 may include wheels 110 and may also employ the central linkage 210, illustrated in FIG. 2 and discussed above, which may manipulate the wheels 110 so that the slippage associated with steering geometries inherently included with convention steering mechanisms 100, such as Ackerman steering geometry, are eliminated in instances where the vehicle may be operated at an angled orientation, such as the case with a towed snowplow being engaged to push snow away from the vehicle. The steering mechanism 200 described here is not, however, limited simply to steering mechanisms that include Ackerman steering geometry.

Figure 3B:
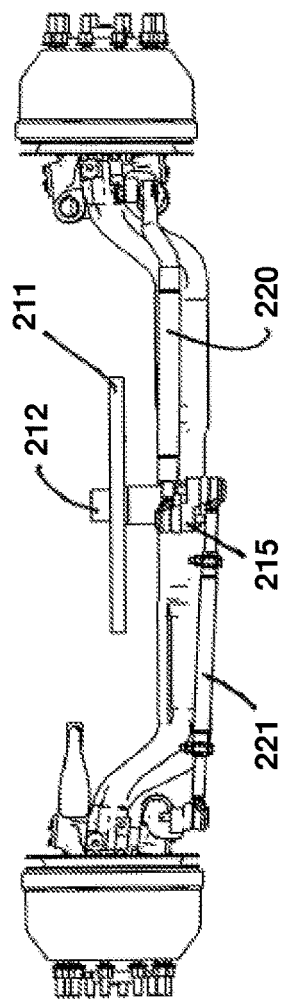
Figure 3C:
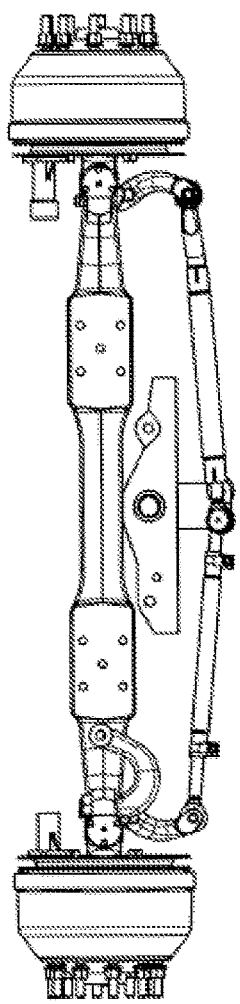
Figure 3D:
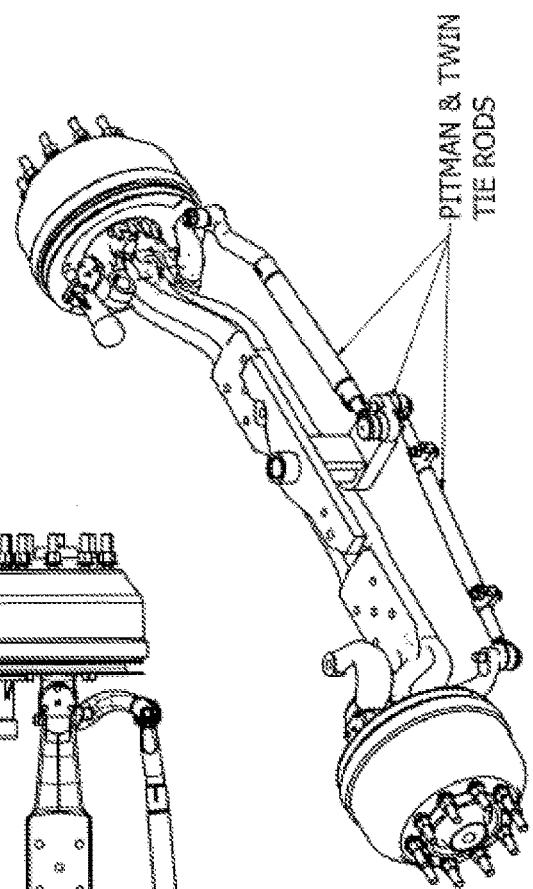

In the embodiment of the steering mechanism 200 depicted in FIGS. 3A-3D, ends of tie rods 220, 221 for the wheels 110 are attached in an overlapping manner. More specifically, tie rod 220 is rotatably secured to attachment point 213 and tie rod 221 is rotatably secured to attachment point 214, which, as discussed above, may result in the tie rods 220, 221 being in a different vertical plane, or otherwise oriented such that movement of the tie rods 220 and 221 do not interfere with one another. As shown in FIGS. 3B and 3D, the structural arrangement of the attachment points 213, 214 results in portions of the tie rods 220, 221 overlapping each other vertically. Accordingly, when the central linkage 210 is rotated about the central linkage pivot 212, the position of the tie rods 220, 221 on the arc defined during rotation of the central linkage 210 alter the horizontal travel of the tie rods 220, 221 in a manner that eliminates steering geometries and ensure the wheels 110 remain parallel to each other. Advantageously, in embodiments employing the depicted central linkage 210, the conventional braking and other control systems employed by the wheels 110 continued to operate effectively. In some embodiments, the wheels 110 may remain parallel while rotating from 0 to 45 degrees. Certain embodiments may also allow for the wheels 110 to remain parallel throughout their rotation from 0 to 33 degrees.

Other variations on the steering mechanism 200 may be employed to alter the horizontal travel of the tie rods 220, 221 so that the wheels 110 remain parallel. Such variations include modification of lengths of the tie rods, altering the location of the central linkage 210 relative to the wheels 110, modifying lengths of steering arms, and altering the placement of the attachment points 213, 214 along the lower portion 215 of the central linkage 210. These and other variations all serve the same purpose of maintaining the wheels 110 in an arrangement parallel to each other throughout their allowed rotational arcs while other structural components can continue to operate with little to no modification, regardless of an angled orientation of the vehicle. More particularly, the steering mechanism 200 allows for the other components including braking systems to continue to operate with regard for the parallel steering geometry resulting from the use of the steering mechanism 200.

FIGS. 4A-4C depict aspects of the steering mechanism 200 with a restriction device 300. The restriction device 300 helps ensure that only the desired rotation occurs in the steering mechanism 200 by restricting the range of motion available to the steering mechanism 200. The restriction device 300 may include a lock plate 310 and a lock plate actuator 330. The lock plate actuator 330 may cause the lock plate 310 to rotate about a pivot point 320 to restrict the rotation of the upper portion 211 of the central linkage 210. In some embodiments, the lock plate 310 may prevent the central linkage 210 from rotation substantially past the center point. The lock plate 310 may accomplish this by coming into contact with portions of the upper portion 211 of the central linkage 210.

Any shape of the lock plate 310 that can prevent unwanted rotation of the upper portion 211 of the central linkage 210 may be employed. This will, for example, prevent a steering mechanism 200 configured for rightward operations from turning excessively leftward, and vice versa. The restriction device 300 may provide a safety mechanism that prevents unexpected behavior during operation of a device employing this steering mechanism 200. For example, if a towed snowplow is engaged facing rightward, the restriction device 300 may prevent the snowplow from turning leftward is the snowplow is disengaged, such as due to over-steering, accidental operation, hydraulic systems failure, and the like. In some embodiments, the lock plate 310 may be shaped so that rotation of the steering mechanism 200 is not possible unless the lock plate 310 has reached the termination of its movement. Such a structural configuration is desirable so that if a failure occurs, the steering mechanism 200 remains locked in its orientation. In still further embodiments, additional reinforcement may be included with the lock plate 310 so that the movement of the central linkage 210 does not result in the lock plate 310 failing to prevent rotation of the central linkage 210, even when the central linkage 210 moves with great force as a result of an impact or other external event.

In at least some embodiments, a hydraulic control system may actuate both the steering mechanism 210 and the restriction device 300 so that safe and predictable operation of the steering mechanism 210 is possible. In one embodiment, two sets of rephasing cylinders may be mounted to each other to operate as one cylinder with two chambers. Based on the desired direction of operation, one of the cylinders may be selectively actuated in this embodiment. When actuated, the steering mechanism 200 may turn in the desired direction due to the actuation of the selectively actuated cylinder. When it is desired to return the system to center, the actuated cylinder is returned to the end of its stroke. At the end of the stroke, the steering mechanism 210 has substantially returned to center. In some embodiments, a selector valve may be used with the restriction device 300 to determine leftward or rightward steering function, which may be configured to disable the opposite direction (e.g., via use of the restriction device 300). In such embodiments, the selector valve may select leftward or rightward steering function and the resulting selection may cause the restriction device 300 to lock rotation of the central linkage 210 so that leftward or rightward steering function is possible with the additional safety provided by the restriction device 300. In embodiments of the steering mechanism 200 that utilize rephasing cylinders, the rephasing cylinders may operate in series with other cylinders to control other aspects of the vehicle. In one embodiment, the rephasing cylinders may simultaneously control a pivoting rear lightbar, a tongue that may be articulated and offset, and other aspects of the vehicle that are not specifically enumerated here. In other embodiments, the rephasing cylinders may cooperate with other aspects of the hydraulic control system to operate components of the vehicle.

In other embodiments, a longer single chamber cylinder may be employed to actuate both the steering mechanism 210 and the restriction device 300. Such embodiments will use components of the restriction device 300 to find the center. In one embodiment, the lock plate 310 is used to determine the center for the steering mechanism 200. In such an embodiment, the lock plate 310 is shaped to block additional steering past the center, helping prevent excessive unwanted steering and also helping simply the steering mechanism 200 by using a single hydraulic cylinder. In these types of embodiments, a selector valve need not be included with the steering mechanism 200, further simplifying the steering mechanism 200. In embodiments of the steering mechanism 200 that utilize the longer single chamber cylinder, the single chamber cylinder may operate in series with other cylinders to control other aspects of the vehicle. The single chamber cylinder may simultaneously control other components including a pivoting rear lightbar, and a tongue that may be articulated and offset. In certain other embodiments, the single chamber cylinder may cooperate with other aspects of the hydraulic control system to operate components of the vehicle.

The steering mechanism 200 described herein may be used in a variety of vehicular configurations. FIGS. 3A-3D illustrated a single steering mechanism 200 controlling two wheels 110. FIGS. 5A-5B illustrates a system 400 with two steering mechanisms 200 being employed to control four wheels 210. One of the steering mechanisms 200 is driven and controlled by an actuator 410 as described above for a steering mechanism 200 controlling two wheels 110. In the system 400 of FIGS. 5A-5B, an inter axle link 420 is attached to an upper portion 211 of the driven central linkage 210 so that the actuation of the driven central linkage 210 results in rotation of the undriven central linkage 210. Such a configuration may allow for vehicles requiring additional wheels 110 for support to also employ parallel rotation of wheels 110 for particular circumstances. In some embodiments of the system 400, both steering mechanisms 200 may be driven by actuators 410, such as with a single actuator connected to tie rods 220, 221 for each steering mechanism 200 or two separate actuators. In certain embodiments of the system 400, each steering mechanism 200 may use a different means of achieving parallel rotation of the wheels 110. For example, one steering mechanism 200 may employ a different means when a larger rotational arc where parallel rotation is maintained.

FIGS. 6A and 6B illustrate an embodiment of a towed snowplow 600 with a left moldboard 610 and a right moldboard 620. FIGS. 6A and 6B depict the moldboards 610, 620 in a raised or stowed position. Each of the moldboards 610, 620 may be lowered, when appropriate, so that plowing operations may begin. In some embodiments, the towed snowplow 600 includes two separately controlled steering mechanisms 200 that each control two wheels 110. In other embodiments, the towed snowplow 600 includes a single steering system 400 that includes two steering mechanisms 200 that are linked by actuators 410 and an inter axle link 420.

A method of using the bi-directional steering mechanism 200 in a towed snowplow 600 is described below. A towed snowplow 600 may be configured to operate in rightward mode when the operator operates a selector valve and selects the rightward mode. This selection may actuate the restriction device 300 so that the lock plate 310 pivots about the pivot point 320. The steering mechanism 200 may then be locked during this rotation so that any failures will not result in a steering mechanism 200 that cannot be controlled. Once the restriction device 300 has achieved rightward mode, the operator may begin operations. The towed snowplow 600 may then be angled rightward by way of the steering mechanism 200 so that rightward plowing may begin. By virtue of the parallel orientation of the wheels 110, the towed snowplow 600 may continue to travel so that the plow efficiently removes snow from the pavement, while minimizing tire wear and providing for smoother operation of the towed snowplow 600 than may be afforded by use of conventional steering mechanisms, such as the traditional steering mechanism 100 illustrated in FIG. 1.

The operator may then switch the towed snowplow 600 to leftward mode. The operator may operate the selector valve and select the leftward mode. The restriction device 300 may then be actuated so that leftward mode is achieved. The restriction device 300 may be actuated until the lock plate 310 achieves leftward mode. During this operation, the steering mechanism 200 may also be locked so that unwanted steering does not occur. After leftward mode is achieved, the operator may resume driving and the towed snow plow 600 may be angled leftward by way of the steering mechanism 200 so that the snowplow continues to operate effectively.

In some embodiments, a selector valve need not be actuated and instead the operator may simply activate the restriction device 300 to limit the steering of the steering mechanism 200. The operator may also simultaneously control other components of the towed snowplow 600 using the mechanism that switches the towed snowplow 600 to the leftward mode. In some embodiments, for example, the snowplow itself is articulated as the steering mechanism 200 operational mode is modified so that the towed snowplow 600 is prepared for operation in leftward mode.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A bi-directional steering mechanism comprising:
a plurality of tie rods; and
a linkage configured to convert rotational motion about a vertical axis into linear motion so that wheels attached to ends of the plurality of tie rods are turned about a common pivot point in a parallel arrangement while the linkage rotates about the vertical axis, the linkage comprising an upper portion attached to an actuator, a middle portion, and a lower portion;
wherein the lower portion of the linkage comprises an end extending radially outward from the vertical axis, the end having horizontally offset attachment points rotatably securing the ends of the plurality of tie rods in a vertically overlapping arrangement where the ends and a portion of each of the plurality of tie rods vertically overlap each other as the linkage rotates about the vertical axis;
wherein a first tie rod extends to a first offset attachment point and a second tie rod extends to a second offset attachment point to form the vertically overlapping arrangement, the first offset attachment point being further from an end of the first tie rod attached to a wheel than the second offset attachment point is from the end of the first tie rod attached to the wheel, and the second offset attachment point being further from an end of the second tie rod attached to a wheel than the first offset attachment point is from the end of the second tie rod attached to the wheel.

2. The steering mechanism of claim 1, wherein a length of at least one of the plurality of tie rods has an adjustable length, the adjustable length maintaining the parallel arrangement of the wheels throughout the rotational motion of the linkage around the axis.

3. The steering mechanism of claim 1, wherein the lower portion of the linkage secures the plurality of tie rods, the plurality of tie rods extending in different planes.

4. The steering mechanism of claim 1, wherein the middle portion of the linkage extends substantially coaxially with an axis connecting the upper and lower portions of the linkage.

5. The steering mechanism of claim 1, wherein the upper portion of the linkage includes at least one attachment point for securing the actuator, the attachment point being offset from the axis so that linear motion of the actuator results in rotational motion of the linkage.

6. The steering mechanism of claim 1, wherein rotation of the linkage is limited by a restriction device.

7. The steering mechanism of claim 6, wherein the restriction device comprises a lock plate and a lock plate actuator.

8. The steering mechanism of claim 7, wherein the lock plate pivots about a pivot point perpendicular to and intersecting the axis of the linkage, the lock plate being configured to prevent rotation of the upper portion beyond a central position when the lock plate is first and second fully engaged positions, the lock plate further being configured to prevent any rotation of the upper portion when the lock plate is pivoting between the first and second fully engaged position.

9. The steering mechanism of claim 8, wherein the lock plate is configured to pivot to abut the upper portion of the linkage and prevent further rotation of the upper portion of the fixture.

10. The steering mechanism of claim 7, wherein the actuator comprises a plurality of hydraulic cylinders, the linkage being centered when a driving hydraulic cylinder reaches an end of stroke.

11. The steering mechanism of claim 10, the actuator further comprises a selector valve, the selector valve restricting an arc of rotation of the linkage by selectively deactivating at least one of the plurality of hydraulic cylinders.

12. The steering mechanism of claim 7, wherein the actuator comprises a hydraulic cylinder, the linkage being centered when the lock plate abuts the linkage.

13. A bi-directional towed snowplow, the towed snowplow comprising:
a steering mechanism as described in claim 1; and
at least two moldboards.

* * * * *